(12) United States Patent
Jang et al.

(10) Patent No.: US 11,422,495 B2
(45) Date of Patent: Aug. 23, 2022

(54) COLOR REGISTRATION IN REAL-TIME

(71) Applicant: Hewlett-Packard Development Company, L.P., Spring, TX (US)

(72) Inventors: Sijoong Jang, Seongnam-si (KR); Jin Kyu Park, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/286,565

(22) PCT Filed: Aug. 9, 2019

(86) PCT No.: PCT/US2019/045915
§ 371 (c)(1),
(2) Date: Apr. 19, 2021

(87) PCT Pub. No.: WO2020/096669
PCT Pub. Date: May 14, 2020

(65) Prior Publication Data
US 2021/0382427 A1    Dec. 9, 2021

(30) Foreign Application Priority Data
Nov. 7, 2018    (KR) .................. 10-2018-0135779

(51) Int. Cl.
| G03G 15/00 | (2006.01) |
| G03G 15/01 | (2006.01) |
| H04N 1/00 | (2006.01) |
| H04N 1/60 | (2006.01) |

(52) U.S. Cl.
CPC ......... *G03G 15/5016* (2013.01); *G03G 15/01* (2013.01); *H04N 1/00748* (2013.01); *H04N 1/00771* (2013.01); *H04N 1/6044* (2013.01); *G03G 2215/0158* (2013.01)

(58) Field of Classification Search
CPC ............ H04N 1/6044; H04N 1/00771; H04N 1/00748
See application file for complete search history.

(56) References Cited

U.S. PATENT DOCUMENTS

| 2005/0207768 A1 | 9/2005 | Suzuki |
| 2007/0126851 A1* | 6/2007 | Yamazaki .......... H04N 1/00045 347/133 |
| 2008/0170277 A1 | 7/2008 | Bae |
| 2009/0166963 A1 | 7/2009 | Fukasawa |
| 2013/0222821 A1 | 8/2013 | Eom et al. |
| 2014/0301758 A1 | 10/2014 | Kim et al. |
| 2015/0125187 A1 | 5/2015 | Bae et al. |
| 2015/0125188 A1 | 5/2015 | Cho et al. |

FOREIGN PATENT DOCUMENTS

| JP | 2003-98794 A | 4/2003 |
| KR | 2003-0042579 A | 6/2003 |

\* cited by examiner

*Primary Examiner* — Victor Verbitsky
(74) *Attorney, Agent, or Firm* — Jefferson IP Law, LLP (57) ABSTRACT

An image forming apparatus and method for color registration are provided. The image forming apparatus according to an example includes a communication device to receive print data, a print engine including a plurality of photosensitive drums, and a processor to control the print engine to print the received print data on a plurality of printing papers, and to form a predetermined pattern for color registration in an inter-paper distance section between two of the plurality of printing papers on a paper feeding path.

14 Claims, 12 Drawing Sheets

COLOR REGISTRATION IN REAL-TIME

BACKGROUND

An image forming apparatus is an apparatus for generating, printing, receiving, and transmitting image data. Representative examples of an image forming apparatus include a printer, a scanner, a copier, a facsimile, and a multifunction printer that integrally implements these functions.

In order to accurately implement a color image, it is important to match the exposure start time of each photosensitive drum (Dy)(Dc)(Dm)(Dk) by an exposure apparatus considering an operation speed of a transfer belt. The matching of the exposure start time to cause a plurality of colors that form an image to be accurately overlapped with one another is referred to as color registration.

BRIEF DESCRIPTION OF THE DRAWINGS

Certain examples of the present disclosure will be more apparent from the following description taken in conjunction with the accompanying drawings, in which.

Throughout the drawings, it should be noted that like reference numerals are used to represent the same or similar elements, features, parts, components, or structures.

DETAILED DESCRIPTION

Hereinafter, various examples will be described with reference to the accompanying drawings. The examples to be described below may also be modified in various forms. In order to more clearly describe features of the examples, a description of matters which are well known to those skilled in the art to which the examples pertain will be omitted.

In the following description, a case in which any component is "connected" with another component includes a case in which the component is "directly connected" to the other component and a case in which the component is "connected to the other component while having another component interposed therebetween." In addition, a case in which any component "comprises" another component means that the component may further comprise other components, and not exclude other components, unless explicitly described to the contrary.

The expression "image forming job" as used herein may refer to various jobs related with an image, such as, formation of an image or generation/storage/transmission of image files (e.g., copying, printing, scanning or faxing), and the expression "job" as used herein may refer to not only the image forming job, but also a series of processes required for performance of the image forming job.

The expression "image forming apparatus" may refer to a device for printing print data generated from a terminal such as a computer on a recoding paper. Examples of an image forming apparatus may include a copier, a printer, a scanner, a facsimile, a multi-function printer (MFP) for complexly implementing functions thereof through a single device, and the like. The image forming apparatus may refer to any device capable of performing an image forming task, such as the copier, the printer, the scanner, the fax machine, the multi-function printer (MFP), or a display.

The expression "printing data" as used herein may refer to data converted into a format that can be printed at a printer. When the printer supports direct printing, the file itself may be the printing data.

The expression "user" as used herein may refer to a person who performs a manipulation related with an image forming job using an image forming apparatus or a device connected to the image forming apparatus in a wired or wireless manner. Further, the expression "manager" as used herein may refer to a person who has authority to access all the functions and systems of the image forming apparatus. The "manager" and the "user" may refer to the same person.

Figure 1:
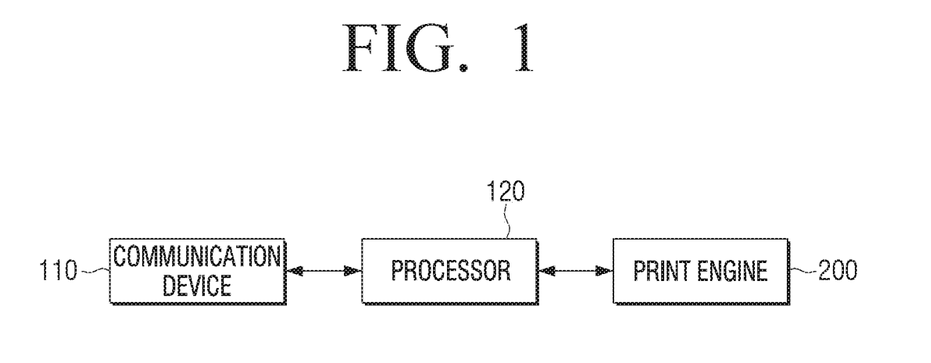
FIG. 1 is a schematic block diagram illustrating an image forming apparatus according to an example.

FIG. 1 is a schematic block diagram illustrating an image forming apparatus according to an example.

Referring to FIG. 1, an image forming apparatus may include a communication device 110, a print engine 200, and a processor 120.

The communication device 110 may be connected to a print control terminal device (not shown) and may receive print data from the print control terminal device. The print control terminal device may be an electronic device for providing print data such as a personal computer (PC), a notebook, a tablet PC, a smartphone, a server, etc.

The communication device 110 may be formed to connect the image forming apparatus to an external device and connected to a terminal device through not only a local area network (LAN) and an Internet network, but also a universal serial bus (USB) port or a wireless communication (e.g., WiFi 802.11a/b/g/n, near field communication (NFC) and Bluetooth) port. The communication device 110 may also be referred to as a transceiver.

The print engine 200 may form an image. The print engine 200 may form a black and white image or a color image on a printing paper by using a plurality of photosensitive drums.

The print engine 200 may form a predetermined pattern for color registration on an intermediate transfer belt. The predetermined pattern may be a pattern which simultaneously modifies a main-scan offset and a sub-scan offset, or a first pattern for modifying only the main-scan offset or a second pattern for modifying only the sub-scan offset.

The processor 120 may control constituent elements of the image forming apparatus. For example, when receiving print data from the print control terminal device (not shown), the processor 120 may perform a rendering operation such as parsing the received print data to generate a print image. The generated print image may be binary data.

The processor 120 may be embodied as a single device such as a central processing unit (CPU), or a plurality of devices including a clock generation circuit, a CPU, a graphic processor, etc. For example, some operations related to video signal generation of the operations to be described below may be performed by a separate image processor.

The processor 120 may determine a printing speed in association with image formation of print data. The processor 120 may determine the printing speed of the image formation considering the type of printing paper (e.g., the required fusing time), the speed of the print engine 200, etc.

The processor 120 may determine an inter-paper distance and an inter-paper speed based on the determined printing speed. The term "inter-paper distance" refers to a distance between printing papers on a paper feeding path thereof.

The processor 120 may determine a registration pattern corresponding to the determined inter-paper distance. For example, when the determined inter-paper distance is short, the processor 120 may determine to use a pattern having a small length (e.g., a pattern for a main-scan direction offset modification or a pattern for a sub-scan direction offset modification) as a registration pattern. However, when the determined inter-paper distance is long, the processor 120 may determine to use a pattern having a relatively longer length (e.g., a pattern for modifying offset both in a main-scan direction and a sub-scan direction) as a registration pattern.

As described above, a registration pattern may be determined after the inter-paper distance is determined. However, this is only an example. It may also be possible to determine a registration pattern and determine a printing speed for printing the determined registration pattern or an inter-paper distance.

For example, the processor 120 may determine whether a pattern for color registration can be formed in the predetermined inter-paper distance section. If it is determined that it may be difficult or not possible to form the pattern for color registration in the predetermined inter-paper distance section, the processor 120 may delay supply of a printing paper to secure the necessary inter-paper distance for functional printing.

The processor 120 may control the print engine 200 so that the received print data may be printed on the printing paper. The processor 120 may control the print engine 200 so that a predetermined pattern may be formed for color registration in an inter-paper distance section between printing papers on a paper feeding path.

The processor 120 may convert a print image corresponding to the received print data and a pattern image corresponding to a predetermined pattern into a video signal and provide the video signal to the print engine 200. The processor 120, based on a page synchronization signal being input, may output a video signal for the print image after a first time corresponding to a first paper margin, and, based on an image forming operation for the print image being completed and a page done signal being input, output a video signal for the pattern image after a second time corresponding to a second paper margin.

Figure 5:
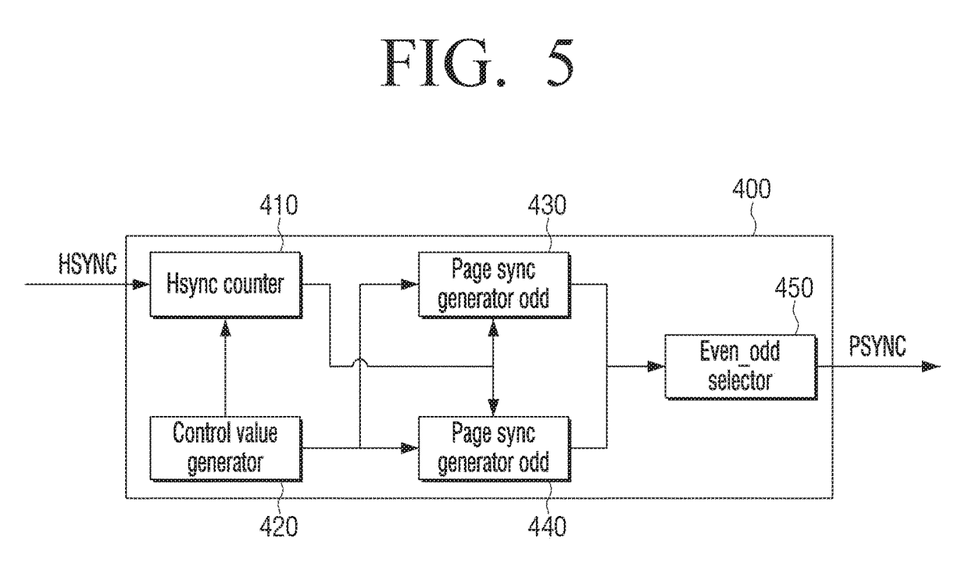
FIG. 5 is a block diagram illustrating a signal generator according to an example.

The page synchronization (PSYNC) signal may be a signal corresponding to a page start time point for each color. In an example, the PSYNC signal may be generated by using a device as shown in FIG. 5. However, this is merely an example. In another example, the PSYNC signal may be generated by an operation module in the processor 120.

The page done signal may be a signal for notifying that formation of the print image for the current page has been completed.

The first paper margin (or space) may be a distance between the start positions of a print image on a printing paper, which could be an upper margin or a lower margin. The second margin may be a distance between the end of the print image and the end of the printing paper, which could be a lower margin or an upper margin.

In various examples, an image forming apparatus may perform color registration on a page-by-page basis or based on a predetermined interval, depending on a desired print quality. For example, color registration on a page-by-page basis may lead to higher printing quality. In addition, no extra time may be required for color registration by using the inter-paper distance section. In other words, both a printing job and a color registration operation may be performed in a printing process using a conventional general printing time.

An image forming apparatus has been illustrated and described above. However, at the time of implementation, various configurations may be further included.

Figure 2:
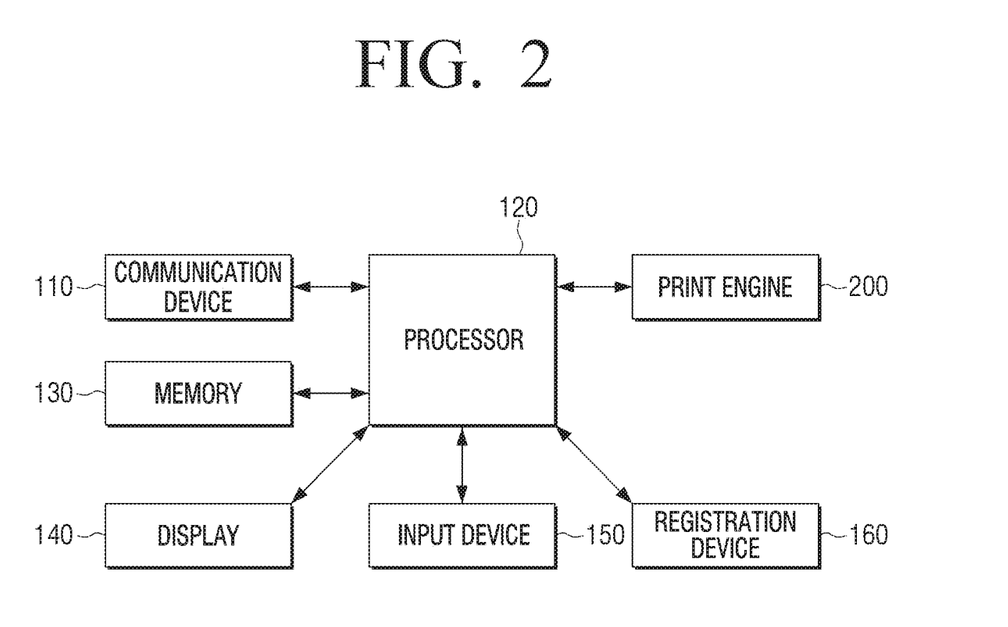
FIG. 2 is a block diagram illustrating an image forming apparatus according to an example.

FIG. 2 is a block diagram illustrating an image forming apparatus according to an example.

Referring to FIG. 2, an image forming apparatus may include a communication device 110, a print engine 200, a processor 120, a memory 130, a display 140, an input device 150, and a registration device 160.

The communication device 110 has been described with reference to FIG. 1, and a repeated description will be omitted. The print engine 200 and the processor 120 have also been described with reference to FIG. 1, and thus a repeated description will be omitted. The further added elements as illustrated in FIG. 2 will be described.

The memory 130 may store print data. As an example, the memory 130 may store print data received from the communication device 110, and may store an image that is rendered based on the received print data. The memory 130 may be embodied as not only a storage medium in the image forming apparatus, but also as an external storage medium, a removable disk including a USB memory, a web server through a network, etc.

The memory 130 may store a pattern image corresponding to a predetermined pattern. The memory 130 may store an inter-paper distance corresponding to a printing speed and a printing speed corresponding to an inter-paper distance. The memory 130 may store information of a color registration result (e.g., an offset value for each color), etc.

The display 140 may display various information provided by the image forming apparatus. The display 140 may display a user interface field for selecting various functions provided by the image forming apparatus.

The input device 150 may receive commands for selecting a function and controlling the function from a user. The function may include a printing function, a copying function, a scanning function, a fax function, etc. The control command may be received through a control menu displayed on the display 140.

The input device 150 may be embodied as a plurality of buttons, a keyboard, a mouse, or a touch screen that simultaneously performs the functions of the display 140.

The registration device 160 may sense the formed pattern and perform color registration based on the sensed pattern. The registration device 160 may sense a main-scan offset (x-axis offset) and a sub-scan offset (y-axis offset) between the formed patterns. An example of a configuration and operation of the registration device 160 will be described below with reference to FIG. 6.

The processor 120 may perform color registration based on the offset value generated by the registration device 160. The processor 120 may control an exposure time point of each exposure apparatus based on the generated offset value for each color. For example, the processor 120 may generate a PSYNC signal based on the offset in the sub-scan direction for each color. An example of a method for generating a PSYNC signal will be described below with reference to FIG. 5.

Figure 3:
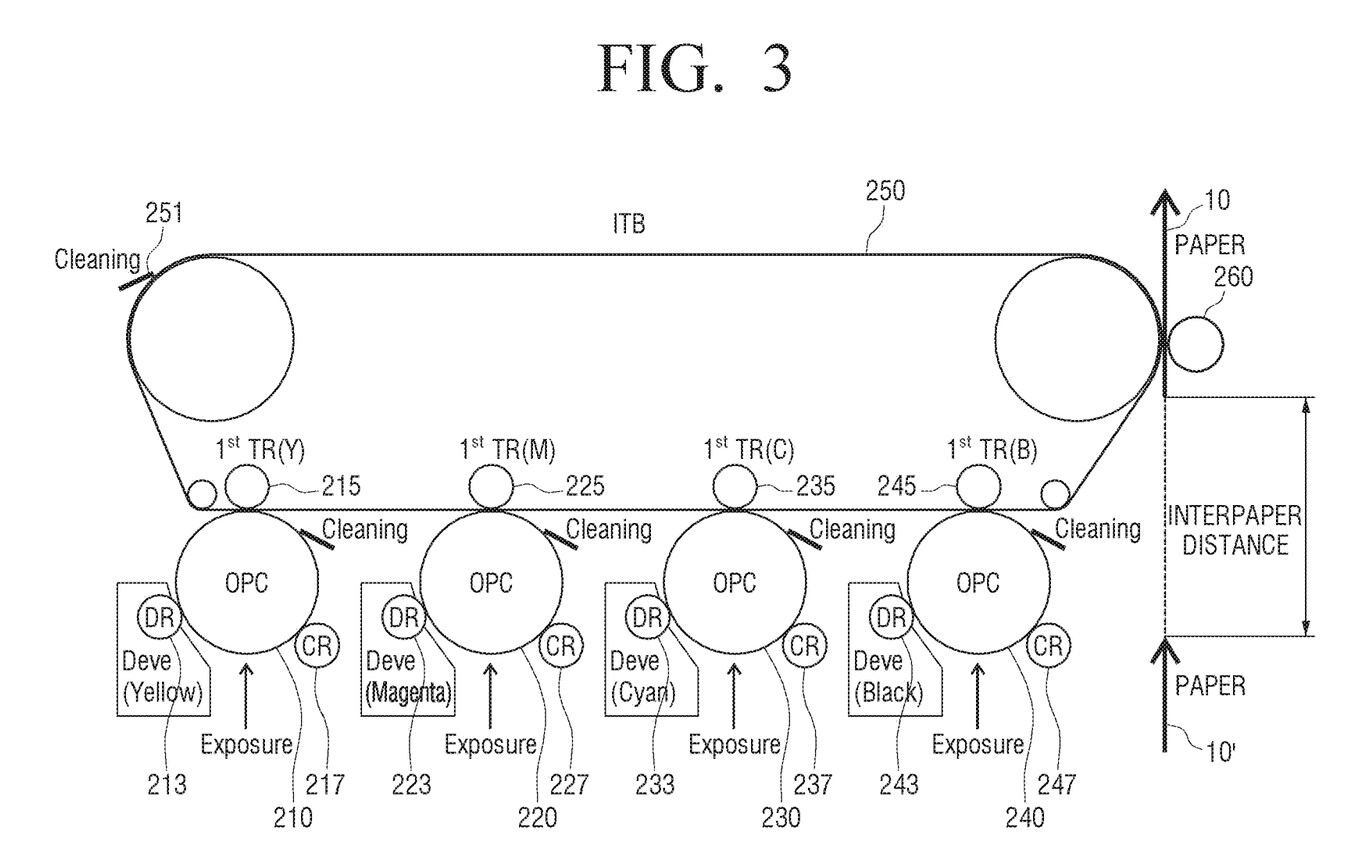
FIG. 3 is a view illustrating a print engine according to an example.

FIG. 3 is a view illustrating a print engine according to an example.

Referring to FIG. 3, a print engine may perform a printing operation using a tandem method. The tandem method is a color printing method in which a photosensitive drum for each color individually forms an image for high-speed output.

The print engine may include a plurality of photosensitive drums 210, 220, 230, and 240 on which an electrostatic latent image may be formed. The photosensitive drums 210, 220, 230, and 240 may be referred to as an organic photoconductor (OPC), a photosensitive drum, a photosensitive belt, etc. depending on their form.

A plurality of chargers 217, 227, 237, and 247 may respectively charge the surface of the photoconductive drums 210, 220, 230, and 240 to a uniform potential. The chargers 217, 227, 237, and 247 may each be implemented in the form of a corona charger, a charging roller, a charging brush, or the like.

An exposure apparatus (not shown) may form an electrostatic latent image on the surface of the photoconductive drums 210, 220, 230, and 240 by changing a surface potential of the photoconductive drums 210, 220, 230, and 240 according to image information to be printed. For example, the exposure apparatus may form an electrostatic latent image by irradiating light modulated according to the image information to be printed to the photoconductive drums 210, 220, 230, and 240. The exposure apparatus of this type may operate in accordance with a page synch signal, and a horizontal synchronization signal, and the operation time point of the exposure apparatus may be controlled depending on the determined main-scan offset value and the sub-scan offset value.

A developing device may include a developer therein and supply the developer to the electrostatic latent image to develop the electrostatic latent image into a visible image. The developing device may include developing rollers 213, 223, 233, and 243 which supply the developer to the electrostatic latent image. For example, the developer may be supplied from the developing rollers 213, 223, 233, and 243 to an electrostatic latent image formed on the photoconductive drums 210, 220, 230 and 240 by a developing electric field formed between the developing rollers 213, 223, 233, and 243 and the photoconductive drums 210, 220, 230, and 240.

The visible image formed on the photoconductive drums 210, 220, 230, and 240 may be primarily transferred to an intermediate transfer belt 250. The image formed on each of the photoconductive drums 210, 220, 230, and 240 may be transferred to the intermediate transfer belt 250 by color transfer printing devices 215, 225, 235, and 245. The image transferred on the intermediate transfer belt 250 may be transferred to printing paper 10, 10' by a transfer printing device 260.

An image may be fixed to printing paper by a fixing device (not shown). A printing job may be completed by a series of processes.

A plurality of pages may be printed by performing such process on a page-by-page basis.

A distance between printing paper on a paper feeding path may be referred to as an inter-paper distance in a printing process of a plurality of pages, and a space on an intermediate transfer belt corresponding to the inter-paper space may be referred to as an inter-paper distance section below.

According to an example, a predetermined pattern may be formed for color registration in the inter-paper distance section. The pattern formed on the intermediate transfer belt may not be transferred to printing paper, and therefore, cleaning may be performed by using a cleaning member 251 disposed on one side.

An example operation of forming a printing image and a pattern image in one page unit will be described with reference to FIG. 4.

Figure 4:
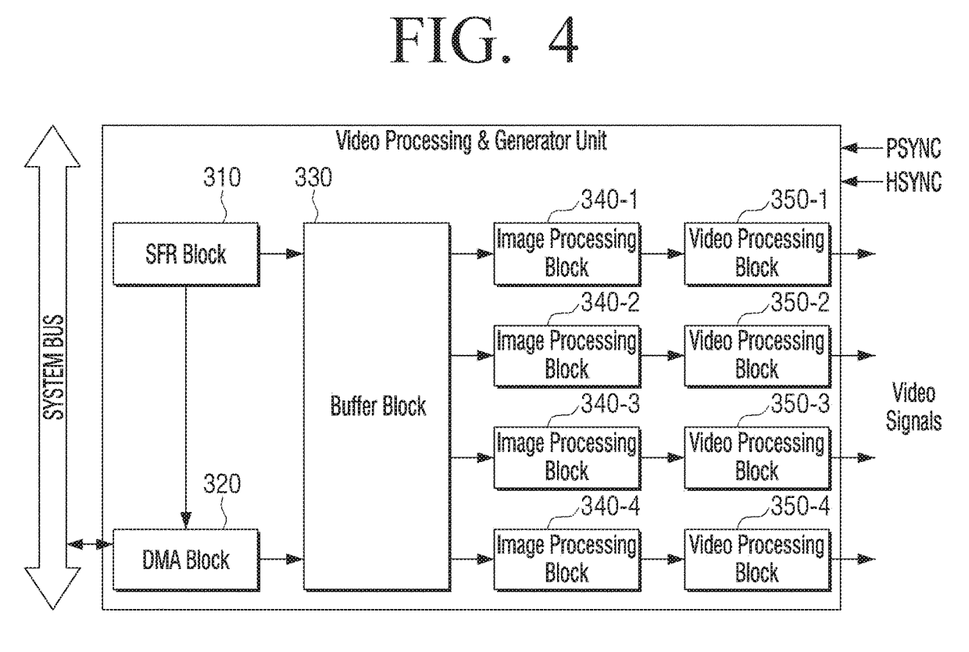
FIG. 4 is a block diagram illustrating an image processor according to an example.

FIG. 4 is a block diagram illustrating an image processor according to an example.

Referring to FIG. 4, an image processor may generate and output a video signal for a print image. The image processor may be a part of the processor 120, or a separate constituent element from the processor 120.

The image processor may include a special function register (SFR) block 310, a direct memory access (DMA) block 320, a buffer block 330, an image processing block 340, and a video processing block 350.

The SFR block 310 may be a register for storing information of an image to be printed by an image forming apparatus. The information of the image may include the position and the resolution of the image, the width, the length, the left and right margin values, the concentration of the image to be output, and the like. The information of the image to be printed may be set before the input of the PSYNC signal.

The SFR block 310 may store not only information on the rendered image (i.e., an image), but also information of a pattern image. Accordingly, there is no need to wait for completion of the rendered image in order to store the information of the pattern image. In addition, there is no need to wait for the completion of printing of the pattern image in order to store the information of the rendered image of a following page.

The DMA block 320 may be a functional block which fetches the image data stored in a memory (e.g., the memory 130) by using a DMA method.

The buffer block 330 may temporarily store image data fetched from the DMA block 320, distinguish image data for each color, and output the image data to each of image processing blocks 340-1, 340-2, 340-3, and 340-4.

Each of the image processing blocks 340-1, 340-2, 340-3, and 340-4 may be a functional block for performing image processing on image data. For example, concentration correction may be performed based on the SFR block 310.

Video processing blocks 350-1, 350-2, 350-3, and 350-4 may convert data output from the image processing blocks 340-1, 340-2, 340-3, and 340-4 into video signals. The video processing blocks 350-1, 350-2, 350-3, and 350-4 may generate and output a line-by-line video signal according to a horizontal synchronization (HSYNC) signal.

Since the video processing blocks 350-1, 350-2, 350-3, and 350-4 output video signals according to the HSYNC signal, an offset in a main-scan direction may be compensated by using the HSYNC signal.

The offset in the sub-scan direction may be compensated through a PSYNC signal. An example of a signal generator for generating a PSYNC signal will be described below.

FIG. 5 is a block diagram illustrating a signal generator according to an example.

Referring to FIG. 5, a signal generator 400 may generate a PSYNC signal. The signal generator 400 may include a horizontal signal counter 410, a control value generator 420, a first signal generator 430, a second signal generator 440, and a selector 450.

The horizontal signal counter 410 may receive a HSYNC signal and count the number of received HSYNC signals. The counter value may be provided to each of the first signal generator 430 and the second signal generator 440.

The control value generator 420 may store offset information on the sub-scan direction and provide the stored information to another constituent element.

The first signal generator 430 may generate a first PSYNC signal. The first signal generator 430 may generate the first PSYNC signal based on a value provided by the horizontal signal counter 410 and an offset value determined after a second PSYNC signal generated by the second signal generator 440.

The second signal generator 440 may generate the second PSYNC signal. The second signal generator 440 may generate the second PSYNC signal based on the value provided by the horizontal signal counter 410 and the offset value determined after the first PSYNC signal generated by the first signal generator 430.

The selector 450 may output the signal generated by the first signal generator 430 as the PSYNC signal in the odd-numbered stage, and output the sync signal generated by the second signal generator 440 as the PSYNC signal in the even-numbered stage.

An example of the signal generator generating the PSYNC signal by using the plurality of signal generators will be described with reference to FIG. 11.

Figure 6:
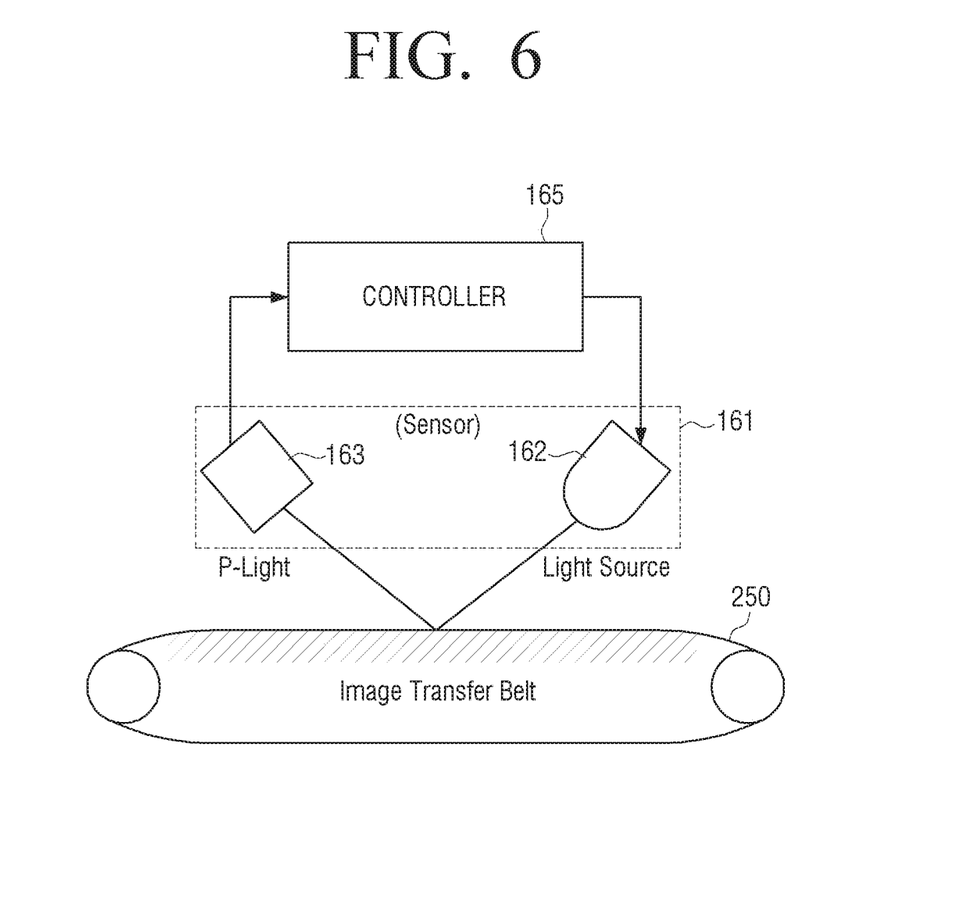
FIG. 6 is a block diagram illustrating a registration device according to an example.

FIG. 6 is a block diagram illustrating a registration device according to an example.

Referring to FIG. 6, a registration device may include a registration sensor 161 and a controller 165.

The registration sensor 161 may include a light emitter 162 and a light receiver 163. The light emitter 162 may emit light on the intermediate transfer belt 250 at a constant output according to a control signal provided from the controller 165, and the light receiver 163 may sense light reflected from the intermediate transfer belt 250 of the light emitted from the light emitter 162. The light emitter 162 may be embodied with a light emitting diode (LED).

The controller 165 may adjust the amount of light emitted by the registration sensor 161. The controller 165 may recognize a predetermined pattern formed on the intermediate transfer belt 250 based on the signal value sensed by the light receiver 163, and determine an offset value for each color accordingly.

Examples of a color registration operation will be described with reference to FIGS. 7 to 9.

Figure 7:
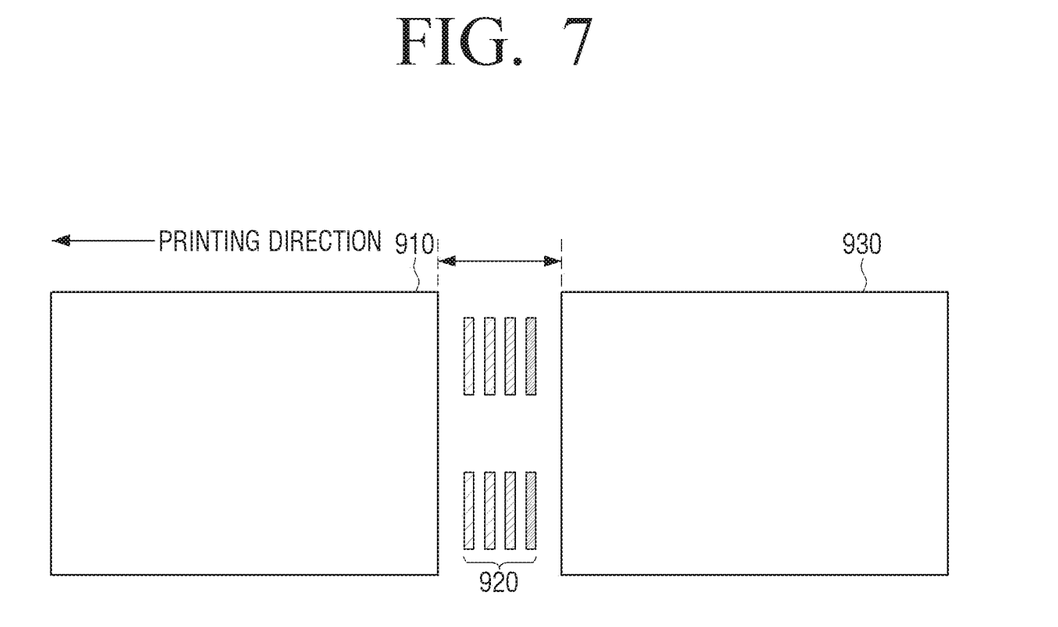
FIGS. 7 to 9 are views to explain a pattern formed according to an example.
Figure 8:
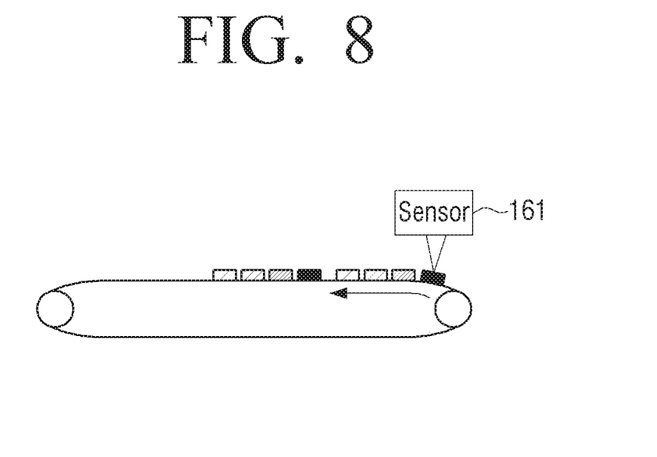
Figure 9:
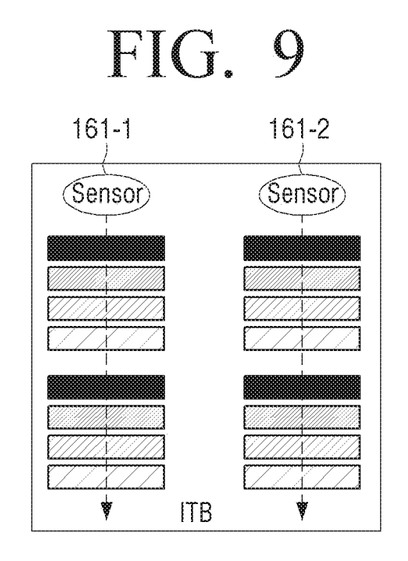

FIGS. 7 to 9 are views to explain a pattern formed according to an example.

FIG. 7 is a view to explain a positon of a predetermined pattern, FIG. 8 is a view to explain a predetermined pattern formed in an inter-paper distance section of the intermediate transfer belt, and FIG. 9 is a side view of FIG. 8.

Referring to FIGS. 7 to 9, an inter-paper distance may exist between a first page 910 and a second page 930. The first page 910 and the second page 930 may be two printing papers from among a plurality of printing papers on which a print image may be formed. According to an example, a predetermined pattern 920 may be formed in an inter-paper distance section of the intermediate transfer belt area corresponding to the inter-paper distance.

The predetermined pattern 920 may include a plurality of patches disposed at predetermined intervals. Each of the plurality of patches may be formed in a bar shape and have a color that is different from the colors of the other patches.

Although four patches are illustrated in FIG. 7, this is merely an example. In other examples, there may be five or more of patches. In addition, although it has been described that a patch set is individually disposed on each of two areas, the patch sets may be arranged in three or more areas in a main-scan direction. The main-scan direction may be a direction perpendicular to the movement direction of printing paper (or the exposure direction of an exposure apparatus), and the sub-scan direction may be the movement direction of printing paper.

Referring to FIG. 8, when the predetermined pattern is formed on the intermediate transfer belt 250 by the print engine, the pattern on the intermediate transfer belt 250 may move below the registration sensor 161 by rotation.

Therefore, when the predetermined pattern moves below the registration sensor 161, the registration device 160 may determine an offset value for each color.

Referring to FIG. 9, a plurality of sensors 161-1 and 161-2 are illustrated as corresponding to the patch sets disposed on each of the two areas. In various examples, the sensors 161-1 and 161-2 may each provide an output signal to a single controller (e.g., controller 165) or to respective controllers. Depending on the example, the single controller or the respective controllers may determine an offset value for each color sensed by the sensors 161-1 and 161-2.

Figure 10:
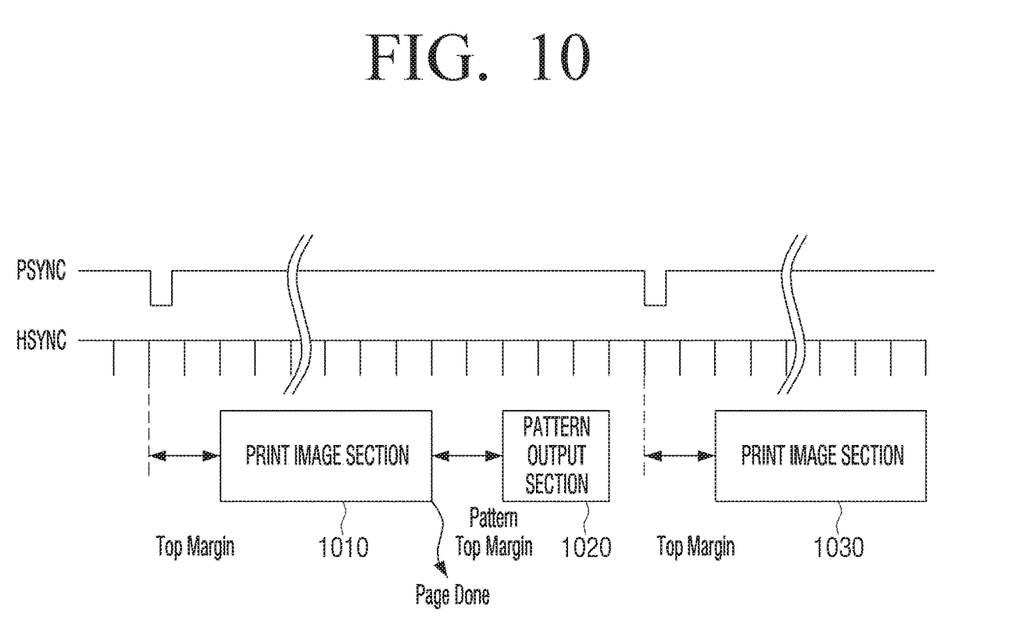
FIG. 10 is a view to explain an operation of an image processor according to an example.

FIG. 10 is a view to explain an operation of an image processor according to an example.

Referring to FIG. 10, when a PSYNC signal is input, an image processor may provide a video signal corresponding to an image to a print engine in accordance with the HSYNC signal after a time corresponding to a first margin (e.g., a top margin) passes. A first print image section 1010 may be printed based on receipt of the video signal corresponding to the image.

When the transmission of the video signal for the image is completed, a page done signal may be generated. When the page done signal is input, the image processor may provide a video signal corresponding to a pattern image to the print engine in accordance with the HSYNC signal after a time corresponding to a second margin (e.g., a pattern top margin) passes. A pattern output section 1020 may be printed based on receipt of the video signal corresponding to the pattern image.

Upon completion of the printing of the pattern output section 1020, the process may repeat. For example, when a PSYNC signal is input, the image processor may provide a video signal corresponding to a second image to the print engine in accordance with the HSYNC signal after a time corresponding to the first margin passes. A second print image section 1030 may be printed based on receipt of the video signal corresponding to the second image.

Figure 11:
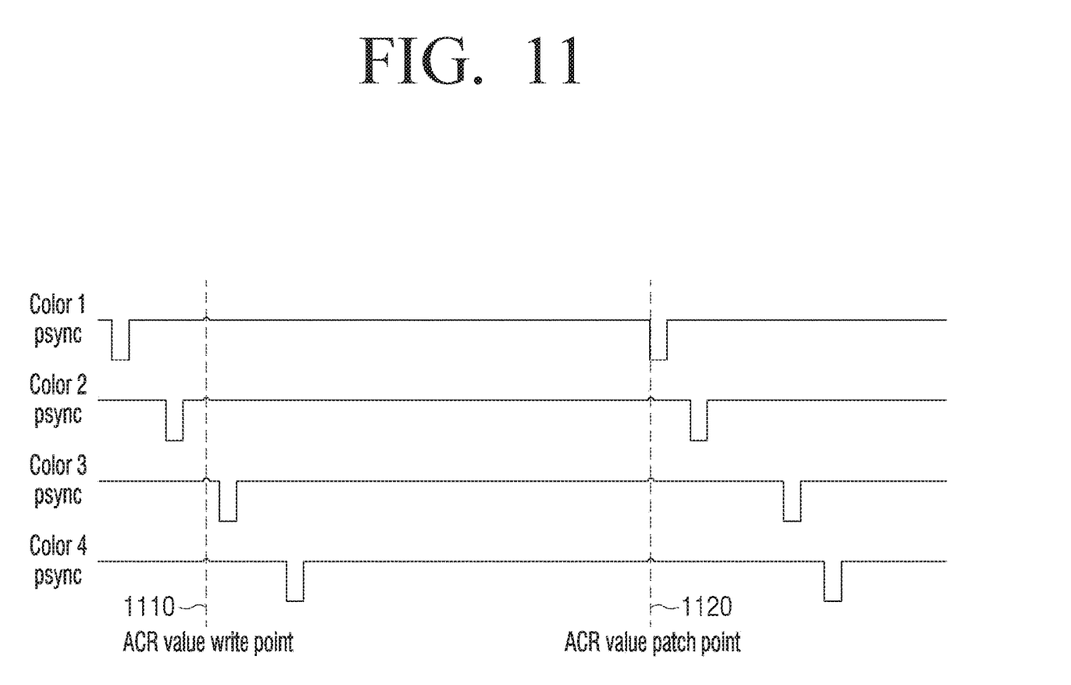
FIG. 11 is a view to explain an operation of a signal generator according to an example.

FIG. 11 is a view to explain an operation of a signal generator according to an example.

Referring to FIG. 11, the registration device 160 may output an offset value in the printing process of an image. For example, an offset value may be determined between a second color and a third color at a time point 1110. When the determined offset value is applied straightaway, an offset value between the first color and the second color and an offset value between the third color and the fourth color may be differently applied, so that the color registration value may not be appropriately reflected.

Therefore, the color registration result may not be applied as soon as it is determined but may be used after the PSYNC signal as a reference. For example, as illustrated in FIG. 11, the PSYNC signal for the first color may be a reference PSYNC signal. Therefore, when offset values are collectively referenced to a time point 1120, the color registration result may be appropriately reflected.

In order to perform such an operation, a plurality of signal generators, such as those shown in FIG. 5, may be used.

Figure 12:
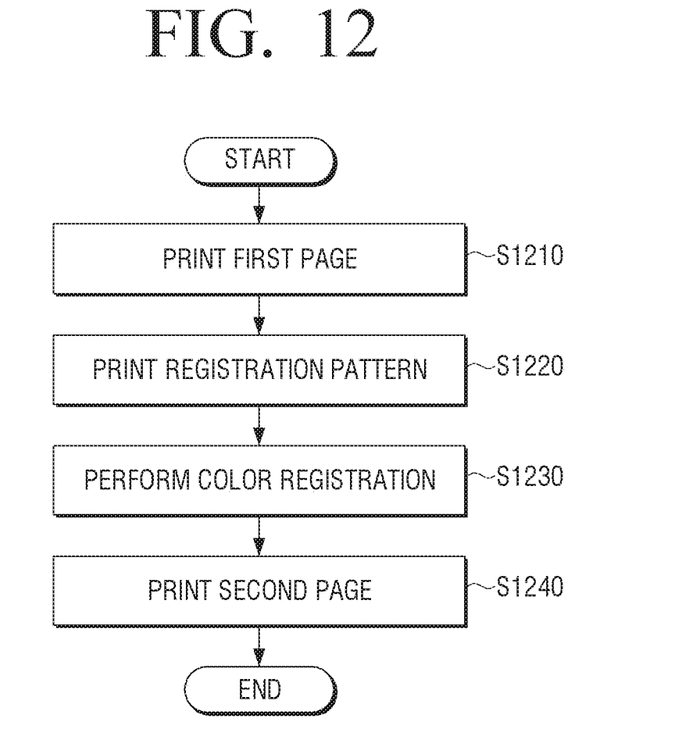
FIG. 12 is a flowchart to explain a method for color registration according to an example.

FIG. 12 is a flowchart to explain a method for color registration according to an example.

Referring to FIG. 12, a first print image including print data may be formed at operation S1210. When a PSYNC signal is input, an image for a first print image may be formed after a predetermined first time passes.

A predetermined pattern may be formed for color registration in an inter-paper distance section between a first printing paper and a second printing paper at operation S1220. When a page done signal, indicating that the printing of the first print image has been completed, is received, a pattern image corresponding to a predetermined pattern may be formed on an intermediate transfer belt after a predetermined second time passes.

Color registration may be performed by using a predetermined pattern at operation S1230. In an example, an offset value for each color may be determined by using a predetermined pattern formed on an intermediate transfer belt.

A second print image included in the print data may be formed at operation S1240. When a new PSYNC signal is input, an image for the second print image may be formed after the first time passes after a new synchronization signal. The new synchronization signal may be a signal reflecting the color registration result. In other words, the new synchronization signal may be a PSYNC signal to which the offset value in the sub-scan direction is reflected.

As described above, according to an example, a color registration method may include performing color registration on a page-by-page basis rather than performing color registration at a predetermined interval, thereby providing a higher printing quality. In addition, since color registration is performed in an inter-paper distance section, no extra time for color registration may be required.

The color registration method as shown in FIG. 12 may be performed by an image forming apparatus having the constituent elements shown in FIG. 1 or FIG. 2, and may also be performed in an image forming apparatus having other constituent elements.

The above-described color registration method may be embodied as a program and provided to an image forming apparatus. The program including the color registration method may be stored in a non-transitory computer readable medium.

The non-transitory computer readable recording medium may refer to a medium that stores data and that can be read by devices. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although examples have been shown and described, it will be appreciated by those skilled in the art that changes may be made to these examples without departing from the principles and spirit of the present disclosure. Accordingly, the scope of the present disclosure is not construed as being limited to the described examples, but is defined by the appended claims as well as equivalents thereto.

What is claimed is:

1. An image forming apparatus, comprising:
   a communication device to receive print data;
   a print engine including a plurality of photosensitive drums; and
   a processor to:
      control the print engine to print the received print data on a plurality of printing papers, and
      control the print engine to form a predetermined pattern for color registration in an inter-paper distance section between two of the plurality of printing papers on a paper feeding path, the predetermined pattern formed having a concentration different from a concentration of the received print data.

2. The image forming apparatus as claimed in claim 1, further comprising:
   an image processor to convert a print image corresponding to the received print data and a pattern image corresponding to the predetermined pattern into a video signal and provide the video signal to the print engine.

3. The image forming apparatus as claimed in claim 2, wherein the image processor comprises a register to store information on the print image and information on the pattern image.

4. The image forming apparatus as claimed in claim 3,
   wherein the register stores concentration information of the print image and concentration information of the pattern image, and
   wherein the image processor generates a video signal for the print image based on the concentration information of the print image stored in the register and generates a video signal for the pattern image based on the concentration information of the pattern image stored in the register.

5. The image forming apparatus as claimed in claim 2, wherein the image processor:
   outputs a video signal for the print image after expiration of a first time corresponding to a first paper margin based on a page synchronization signal being input, and
   outputs a video signal for the pattern image after expiration of a second time corresponding to a second paper margin based on a page done signal being input.

6. The image forming apparatus as claimed in claim 1,
   wherein the print engine prints the predetermined pattern on an intermediate transfer belt using the plurality of photosensitive drums,
   wherein each of the plurality of photosensitive drums corresponds to a color that is different from a color of a remainder of the plurality of photosensitive drums, and
   wherein the image forming apparatus further comprises a registration device to determine an offset value for each color by recognizing the predetermined pattern formed on the intermediate transfer belt.

7. The image forming apparatus as claimed in claim 1, further comprising:
   a signal generator to generate a page synchronization signal corresponding to an offset value in a sub-scan direction.

8. The image forming apparatus as claimed in claim 7, wherein the signal generator comprises:
   a first signal generator to generate a first page synchronization signal;
   a second signal generator to generate a second page synchronization signal based on offset information determined after the first page synchronization signal; and
   a selector to alternately output the first page synchronization signal and the second page synchronization signal, wherein the first signal generator generates the first page synchronization signal based on offset information determined after the second page synchronization signal.

9. The image forming apparatus as claimed in claim 1, wherein the processor controls the print engine to alternately print a first pattern having a predetermined first form and a second pattern different from the first pattern in a unit of the inter-paper distance section.

10. The image forming apparatus as claimed in claim 9,
wherein the first pattern includes a pattern for detecting offset in a main-scan direction, and
wherein the second pattern includes a pattern for detecting offset in a sub-scan direction.

11. A method for color registration of an image forming apparatus, the method comprising:
forming a first print image included in print data;
forming a predetermined pattern for color registration in an inter-paper distance section between a first printing paper and a second printing paper, the predetermined pattern formed having a concentration different from a concentration of the first print image;
performing color registration by using the formed predetermined pattern; and
forming a second print image included in the print data.

12. The method as claimed in claim 11, wherein the forming of the predetermined pattern comprises printing a first pattern having a predetermined first form and a second pattern, different from the first pattern, alternately in a unit of the inter-paper distance section.

13. The method as claimed in claim 11,
wherein the forming of the first print image comprises forming the first print image after a first time corresponding to a first paper margin passes based on a page synchronization signal being input, and
wherein the forming of the predetermined pattern comprises outputting a video signal for a pattern image after a second time corresponding to a second paper margin passes based on a page done signal being input.

14. The method as claimed in claim 11, wherein the performing of the color registration comprises sequentially determining an offset value for each color by using the formed predetermined pattern, and, based on offset values for all colors being determined, reflecting the determined offset values collectively.

\* \* \* \* \*